United States Patent [19]

Sorensen et al.

[11] 4,425,058

[45] Jan. 10, 1984

[54] FORAGE BLOWER DISCHARGE CONDUIT

[75] Inventors: Robert Sorensen, Glen Ellyn; Edward A. Barrett, Glendale Heights; Thomas J. Scarnato, Barrington, all of Ill.

[73] Assignee: International Harvester Co., Chicago, Ill.

[21] Appl. No.: 299,904

[22] Filed: Sep. 8, 1981

[51] Int. Cl.³ .............................................. B65G 53/58
[52] U.S. Cl. ...................... 406/100; 406/57; 406/193
[58] Field of Search .................. 406/42, 57, 58, 71, 406/80, 107, 97–104, 193; 415/148, 151, 155, 183

[56] References Cited

U.S. PATENT DOCUMENTS 755,401  3/1904  Sharpe, Jr. ........................... 406/101
787,917  4/1905  Harpstrite ............................ 406/101

FOREIGN PATENT DOCUMENTS 550806  12/1957  Canada ................................. 406/71

Primary Examiner—Jeffrey V. Nase
Attorney, Agent, or Firm—Boris Parad; F. David AuBuchon

[57] ABSTRACT

A centrifugal blower has an offset between a housing rim sheet and discharge conduit outer wall. A vertical panel attached to the rim sheet guides the feed material into the silo pipe center portion without contacting the conduit outer wall and discharge duct. An air inlet for secondary air flow is provided in this offset to supplement the principal air flow entering through material feed inlet into the blower and to provide an air cushion between the air-borne material and outer wall, as well as the initial portion of the discharge duct.

7 Claims, 7 Drawing Figures

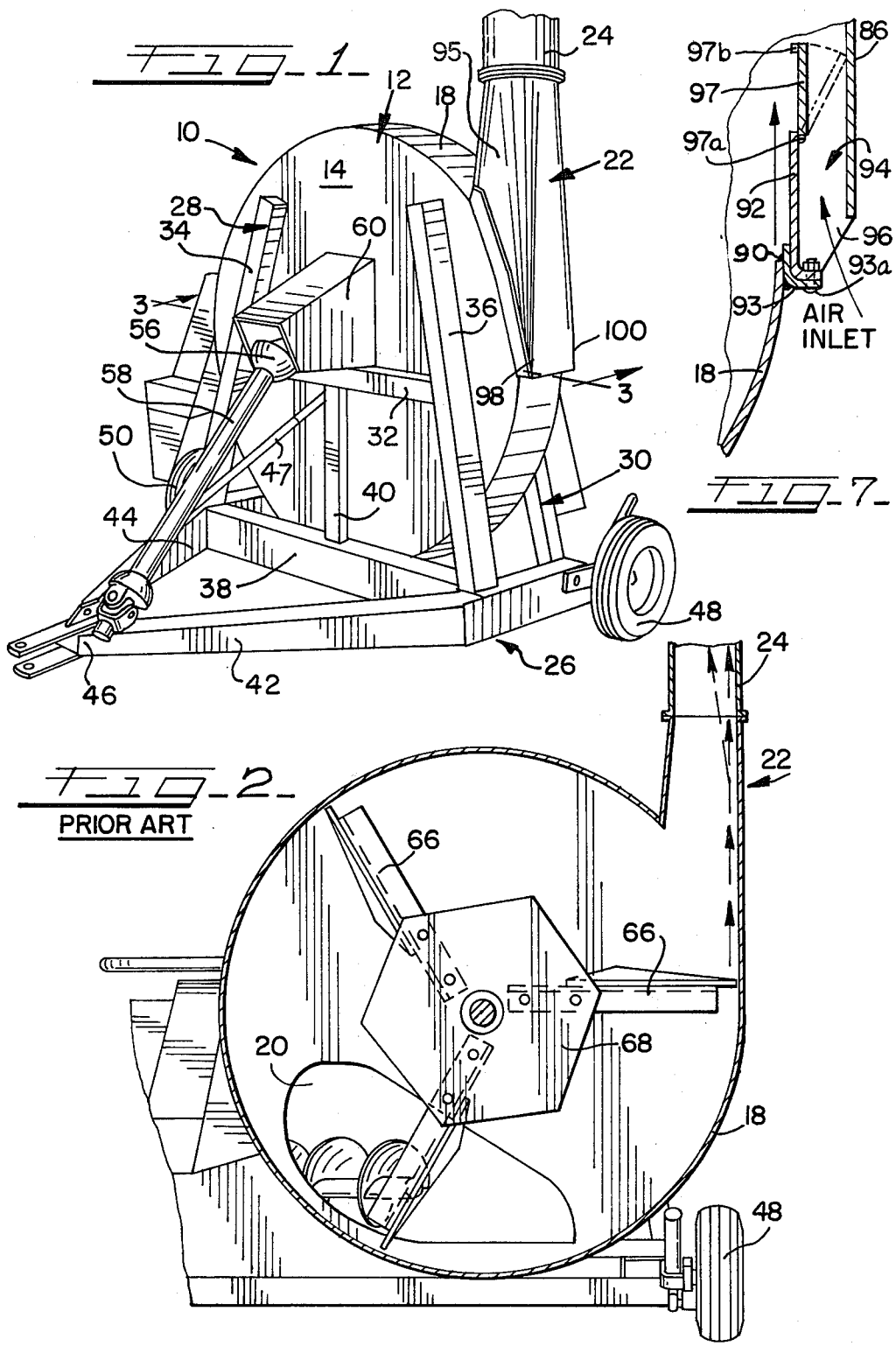

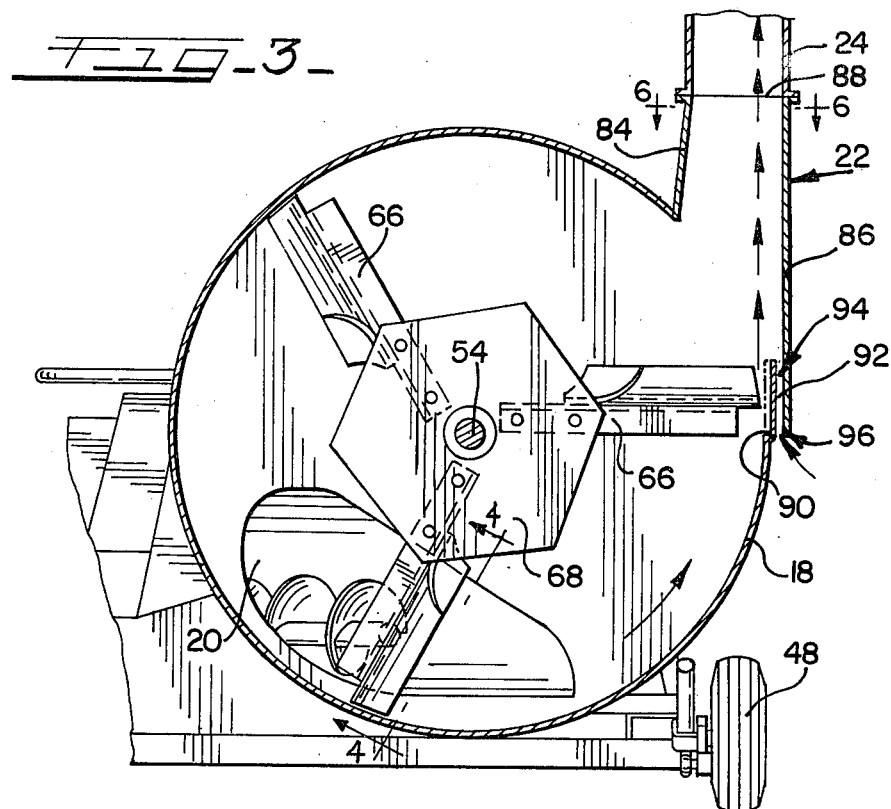
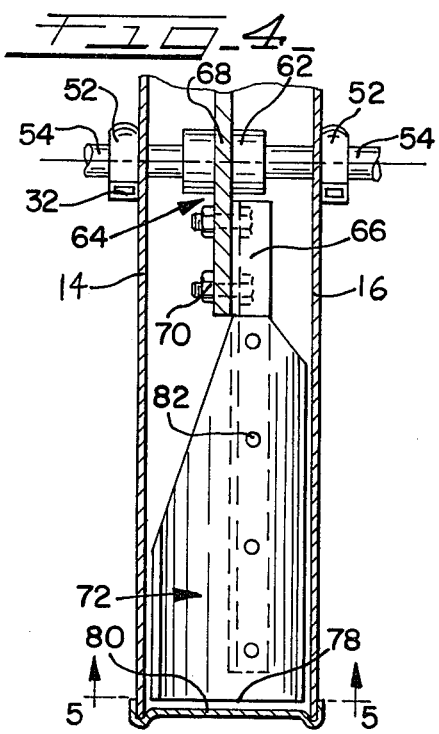
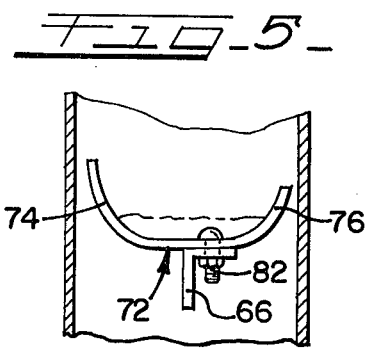
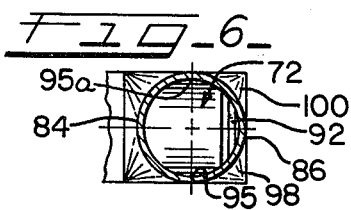

FORAGE BLOWER DISCHARGE CONDUIT

BACKGROUND OF THE INVENTION

1. Field of the Invention

This invention relates to forage blowers and more particularly to a forage blower having a discharge conduit with an offset outer wall.

2. Description of the Prior Art

Heretofore, it has been evidenced that considerable energy loss occurs in the initial sections of a discharge pipe attached to a conventional forage blower. For example, in the article written by David S. Cotten and William F. Millier, "Studies to Determine the Applicability of Theory Describing the Flow of Forage Through a Blower and Pipe," 1983, it was pointed out that as the forage leaves the blower, the major portion thereof is in contact with the side of the pipe and a considerable energy loss occurs because of the friction generated. Also, it was noted that a major problem in a forage flow exists in the first twenty feet or less of pipe, since most of the energy loss occurs in this distance due to friction between the particles and pipe wall. Conventional blower discharge housing is located generally tangentional to the blower rim sheet and is directed vertically for discharge into the silo pipe. The outlet or discharge housing forms a transition section from the rectangular cross-section of the blower housing to the circular cross-section of the silo pipe. A material which flows against the outer wall of the discharge conduit must flow against this transition section. Material upward flow is both slowed down and misdirected by the transition section and particularly its corners which causes friction losses, ricochetting and further velocity losses as the stream moves up the pipe.

In the past, various approaches to the solution of the above mentioned problems have been suggested. For instance, F. W. Duffee in his "Ensilage Cutters", 1930, article proposed to reduce the excessive wear of the outside of the discharge housing excessive wear by leaving a space between the bottom of the discharge housing in the fan housing or by incorporation of all of the offset in the angle of the discharge housing. "A combination of the two is probably desirable".

However, the prior art references of record do not disclose or teach novel design of the discharge conduit as disclosed and explained in the subject invention.

SUMMARY OF THE INVENTION

According to the invention, a centrifugal blower for conveyance of certain materials comprises a blower housing with a material feed inlet through which a principal air flow for the blower is supplied. A discharge conduit is positioned generally tangentially to the blower housing. The housing comprises a pair of coaxially spaced side sheets encompassed by a rim sheet. An impeller located substantially centrally within the housing has paddles carrying and imparting impetus to the material. The material discharge conduit comprises an outlet opening, communicating with a discharge duct attached to the conduit. The conduit has side, inner and outer walls. Guiding means extend between the side walls for directing the material stream into the duct through the conduit outlet opening. The outer wall of the discharge conduit is offset from the guiding means. An air inlet is provided in the offset between the guiding means and the outer wall to provide the system with a supplementary air flow and air cushion between the material and the conduit outer wall.

BRIEF DESCRIPTION OF THE DRAWINGS

FIG. 1 is a perspective illustrative view of the centrifugal forage blower;

FIG. 2 is a cross-sectional view of a forage blower of a conventional design;

FIG. 3 is a cross-sectional view taken substantially along the lines 3—3 of FIG. 1;

FIG. 4 is a cross-sectional enlarged view taken substantially along the lines 4—4 of FIG. 3;

FIG. 5 is an enlarged sectional view taken substantially along the line 5—5 of FIG. 4;

FIG. 6 is a cross-sectional view taken substantially along the line 6—6 of FIG. 3; and FIG. 7 is an enlarged fragmentary view of FIG. 3.

DESCRIPTION OF THE PREFERRED EMBODIMENT

Referring now to the drawings wherein reference characters designate like or corresponding parts throughout the several views, there is shown in FIG. 1 a forage or material blower generally designated 10 comprising a generally cylindrical blower housing 12 which has a pair of vertical axially spaced and substantially radial side sheets or side walls 14 and 16 and a peripheral wall or rim sheet 18. A feed material inlet 20 is communicating with the side wall 16, as best shown in FIG. 3. A discharge conduit 22 is pivotally attached to the blower housing 12 and is disposed essentially tangentially with respect to the peripheral wall 18 and communicating with an upwardly directed duct or piping 24 rigidly attached thereto.

The housing 12 is connected to a framework generally designated 26 which includes front and rear frame sidings 28, 30 embracing the blower housing 12 therebetween and integrated suitably either by bolting or welding with the respective side walls 14 and 16. The H-shaped frame 28 comprises a horizontal axle beam 32 and a pair of laterally spaced and inclined towards each other leg members 34, 36 which at their lower ends are connected by a substantially horizontal brace 38. A vertical support stand 40 is provided between the brace 38 and the axle beam 32.

The frame structures 28 and 30 are hingedly connected to the forwardly converging side beam members 42 and 44 of the A-shaped draft frame 46 and supported with a diagonal brace 47. The beam members 42 and 44 are provided with suitable spindles mounting support wheels 48 and 50.

The frame structure 28 also supports a bearing assembly 52, as best shown in FIG. 4, adjacent to the side wall 14 on the beam 32. The bearing structure 52 supports a shaft 54 which is suitably connected through a universal joint 56 to a power shaft 58. It will be understood that the input of power to the blower may be from any source. The end of shaft 54 is covered by a shield 60 having an inverted U-shape configuration.

As shown in FIGS. 3, 4 and 5, the shaft 54 is connected to the hub 62 of the impeller or rotor generally designated 64 which comprises a plurality of radial arms 66 connected to a rotor plate 68 by bolts 70 or other suitable mechanical means. Each of the radial arms 66 carries a concave paddle 72, with curved up sides 74 and 76, at its outer extremity, as shown in FIG. 5. A paddle outer edge 78 is spaced radially inwardly slightly from the internal periphery 80 of the peripheral wall or rim sheet 18. The impeller 64 is rotated in the direction shown by the arrow in FIG. 3 about a substantially horizontal axis as defined by the shaft 54. Each paddle 72 and arm 66 are connected by bolts 82 or other suitable mechanical means.

The discharge housing or conduit 22 comprises an inner wall 84 facing the blower housing and outer wall 86 being opposite to the inner wall 84. A discharge outlet opening 88 in the conduit 22 communicates with the vertical duct or pipe 24. The annular rim sheet 18 has an edge 90 vertically coextensive with the horizontal axis of the shaft 54. A guiding vertical panel 92 is rigidly attached to the angle 93 by bolts 93a or other suitable mechanical means. The panel 92 transversely extending to conduit side walls 95, 95a is integrally connected thereto by welding or the like means. The angle 93 is welded to the rim sheet 18 and edge 90. The panel 92 can be substituted by a vertical rim sheet extension, as shown in phantom line in FIG. 3. The outer wall 86 is offset from the vertical panel 92. This offset 94 comprises an air inlet 96 which can have a freely hinged door 97 to close off an air flow into the conduit 22 when conditions exist which would cause air to back flow out of the duct 24. As shown in FIG. 7, the door 97 upward movement about a hinge 97a is limited by stops 97b located on the conduit side walls 95, 95a. The air flow can be generated by a pressure differential between the reduced blower inside pressure and outside atmospheric pressure or by another pressure source.

The discharge conduit 22 comprises transition sections 98 and 100 from the rectangular cross-section of the blower housing 12 to the circular cross-section of the pipe 24, as best shown in FIG. 6.

In operation, when the material like a forage or silage enters through the material inlet 20 into the blower housing 12, the impeller 64 picks up this material with its paddles 72, gives it an impetus and discharges it into the discharge conduit 22. The construction of the discharge conduit 22 is such that it directs the material flow free from contact with the outer wall 86 and silo pipe or duct 24 in contradistinction with the conventional blower, as shown in FIG. 2. The principal air flow to a forage blower 10 normally enters the blower housing 12 at the material inlet 20. If this air source is momentarily encumbered by the material, the air inlet 96 in the blower discharge conduit can supply air to the material flow already traveling up in the silo pipe 24. The panel 92 directs material into a vertical path, which is normal to the housing horizontal center plane passing through the center of the shaft 54, when the material enters the paddle unloading zone as soon as a paddle passes its horizontal position. The vertical panel 92 serves as a guiding means for directing the material flow into the silo duct 24 and into a trajectory bypassing the conduit transition corners 98, 100, thereby concentrating the material flow in the duct center portion. The air inlet 96 permits the entry of a supplementary or secondary air flow into the system in addition to the principal air flow entering through the material inlet 20 and facilitates the necessity of this system to have an additional amount of air caused by intermittent material feed. This supplementary air flow provides not only a material transportation medium but also provides an air blanket or cushion between the material flow and the conduit outer wall thus reducing friction losses.

The paddle 72 shape also contributes to the efficiency of the system by having curved up sides 74, 76 which gather the material to the center, two-thirds of the total width of the paddle, during the paddle contact with the material. Such paddle will keep the material flow from contacting the side walls 14 and 16 or rear side of the blower discharge conduit 22 as it is discharged from the blower up into the silo pipe 24. Eliminating this material flow contact with the side walls will eliminate material velocity losses in this area.

The novel discharge conduit directs the material from the paddle into the silo pipe in a controlled manner which reduces contact of the material stream with the blower discharge conduit and the silo pipe. Reducing this material contact reduces the friction losses in this area. The material is thus allowed to move up into the silo duct at the greater velocity, which will allow the blower to elevate material to greater heights without plugging. This also increases the conveying capacity of the system since when the material moves faster, more material volume per unit of time can be conveyed through a given pipe size.

The foregoing description and drawings merely illustrate the invention and the invention is not limited thereto, except insofar as the appended claims are so limited, and so those skilled in the art who have the disclosure before them will be able make modifications and variations therein without departing from the scope of the invention.

What is claimed is:

1. A centrifugal blower for conveyance of certain materials comprising:
   a blower housing of an essentially circular shape including a material feed inlet through which a principal air flow for the blower being supplied and a discharge conduit positioned generally tangentially to said blower housing;
   said housing comprising a pair of coaxially spaced side sheets encompassed by a rim sheet;
   an impeller located substantially centrally within said housing and having paddles carrying and imparting impetus to said material;
   said material discharge conduit comprising:
   an outlet opening communicating with a discharge duct attached to said conduit;
   a tapering transition section extending from said housing comprising side walls, an inner wall facing said blower housing and outer wall being opposite to said inner wall;
   said outer wall being substantially tangential with said blower housing;
   guiding means extended between said conduit side walls and substantially tangential to said blower housing for a limited extent for directing the material stream to said duct through said outlet opening; and
   said outer wall being offset from and overlapping said guiding means to thereby define an air supply means for facilitating the entry of secondary air flow into said housing thereby supplementing said principal air flow and providing air cushion between air-borne material and said conduit walls.

2. The blower according to claim 1, and said air supply means comprising an inlet opening permitting an entry of ambient air into said conduit due to a pressure differential between the atmospheric pressure and blower inside pressure.

3. The blower according to claim 1, and said air supply means comprising an air inlet and a movable element for blocking the air flow through said inlet in order to prevent a back air flow from said discharge duct.

4. The blower according to claim 1, and
said guiding means comprising a panel rigidly and detachably secured to said rim sheet transversely to said conduit side walls, and
said panel directing the material stream into a trajectory bypassing said conduit transition section and going into said duct.

5. The blower according to claim 1, and
said paddles having a concave shape for facilitating the conveying material separation from said side sheets.

6. A blower for conveyance of certain materials comprising:
a blower housing of an essentially circular shape including a material feed inlet through which a principal air flow for the blower being supplied and a discharge conduit positioned generally tangentially to said blower housing;
said housing comprising a pair of coaxially spaced side sheets encompassed by a rim sheet;
an impeller located substantially centrally within said housing and having paddles carrying and imparting impetus to said material;
said material discharge conduit comprising:
an outlet opening communicating with a discharge duct attached to said conduit;
a tapering transition section extending from said housing comprising side walls, an inner wall facing said blower housing and outer wall being opposite to said inner wall;
said outer wall being substantially tangential with said blower housing;
guiding means extended between said conduit side walls for directing the material stream to said duct through said outlet opening; and
said outer wall being offset from and overlapping said guiding means to thereby define an air supply means provided for facilitating the entry of secondary air flow into said housing thereby supplementing said principal air flow and providing air cushion between air-borne material and said conduit walls;
said secondary air flow merging with tangentially thrown conveying material near a blower housing center plane normal to said conduit.

7. The blower according to claim 6, and said air inlet being attached to an associated outside air source having pressure greater than pressure within said housing.

* * * * *